Feb. 23, 1932.  J. A. BERGQUIST  1,846,579
RAILWAY SIGNAL WITH ELECTRICAL DISENGAGING RELAYS
Filed Jan. 20, 1928  2 Sheets-Sheet 1
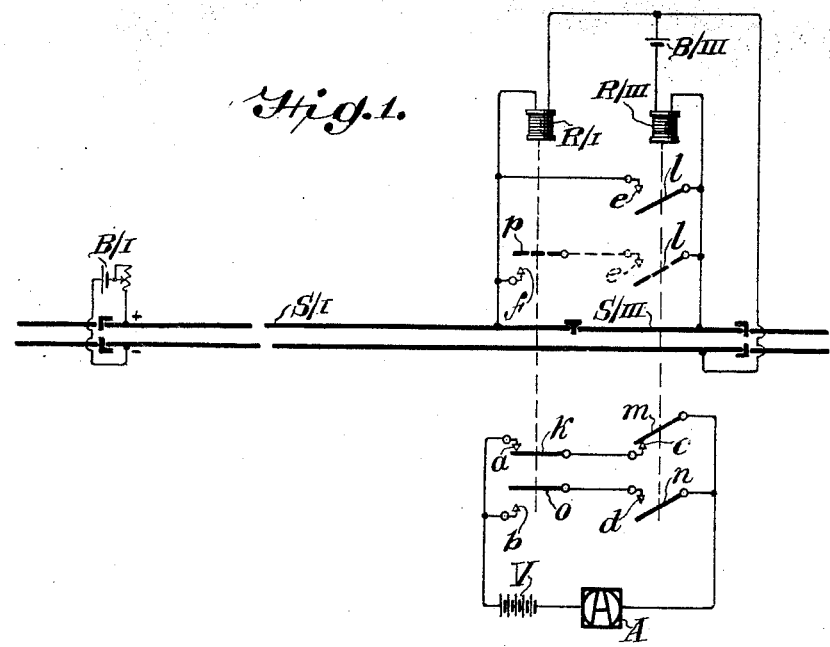
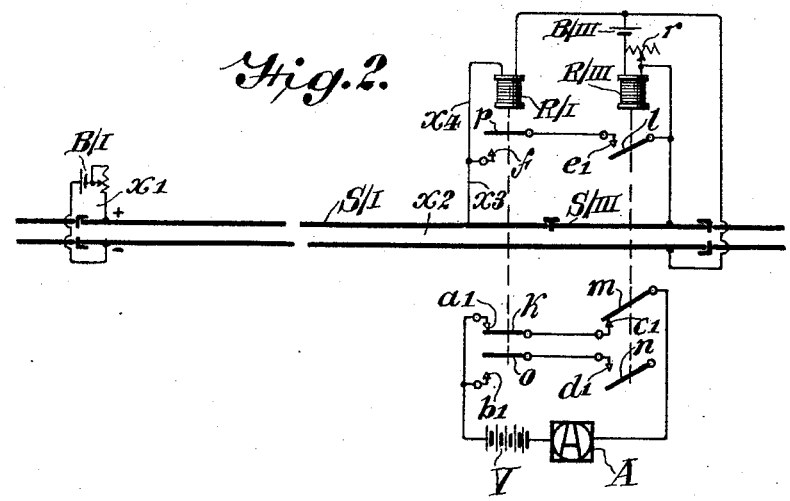

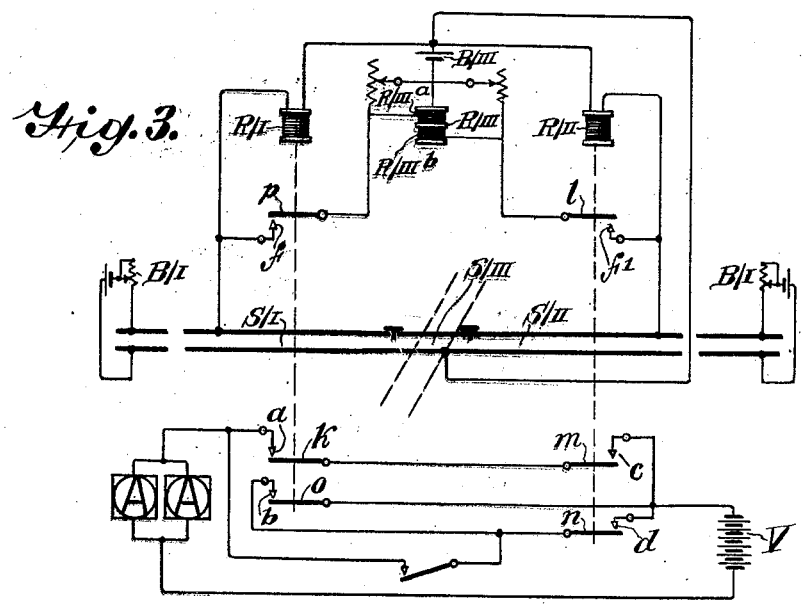
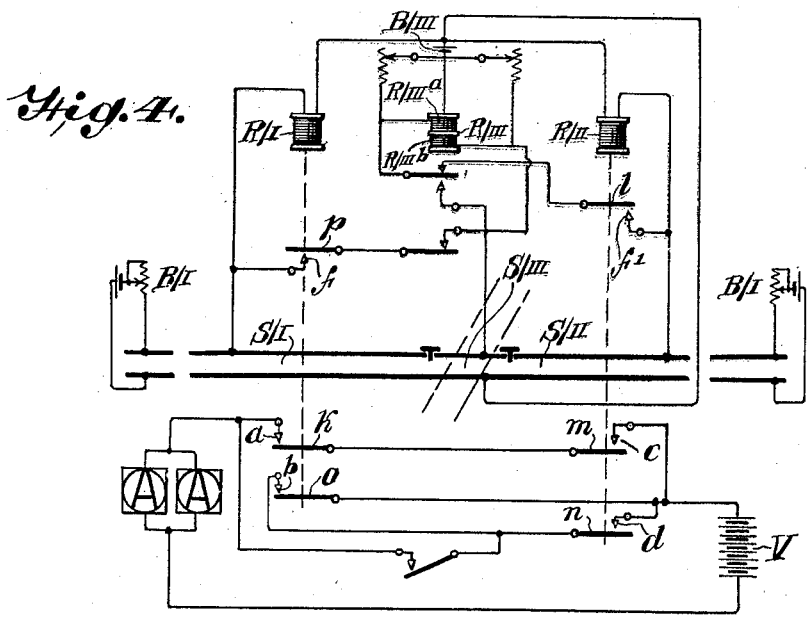

Patented Feb. 23, 1932

1,846,579

UNITED STATES PATENT OFFICE

JOHN ARTHUR BERGQUIST, OF STOCKHOLM, SWEDEN, ASSIGNOR TO AMERICAN GASACCUMULATOR COMPANY, OF ELIZABETH, NEW JERSEY, A CORPORATION OF NEW JERSEY

RAILWAY SIGNAL WITH ELECTRICAL DISENGAGING RELAYS

Application filed January 20, 1928, Serial No. 248,087, and in Sweden February 5, 1927.

In order to obtain a practically infallible release of railway signals, such, for instance, as the signals used at road crossings, insulated track sections are employed in conjunction with a relay, which is fed with current from a source connected to the rails. When no train is passing over the track section involved, the armature of the relay holds a contact closed, whereby a circuit is established through the signal device such that the signal gives the "off" (or "line clear") indication. When a train enters the said track section the relay current is short-circuited, so that the relay will be de-energized, whereupon its armature opens the aforesaid contact and thereby causes the signal to change to the "on" (or "danger") indication in known manner. As it is desirable in the case of certain signals, that the release be operated only for trains moving in the one predetermined direction, two or more track sections have been combined in such a way, that no release is effected by trains, moving in the opposite direction.

Figs. 1 to 4 of the accompanying drawings illustrate modified diagrams of the electric couplings according to the invention. In Fig. 1 the reference R/I indicates the ordinary relay, which normally receives current from a battery B/I through the track section S/I, so that its armature is kept attracted, whereby the relay finger $k$ closes the contact at $a$, included in the circuit of the signal device A and, this circuit being closed, the signal gives the "off" indication. When a train enters the track section S/I, the ordinary relay R/I loses its supply of current and the relay finger $k$ consequently breaks the contact at $a$, so that the circuit of the signal device A is broken or so varied as to cause the signal to show the "on" indication. Reference R/III indicates a disengaging relay through which normally no current flows, but which is adapted to be energized by current from the battery B/III, over the track section S/III, when a train enters said section. The armature of the relay R/III is then attracted, whereupon the said relay can receive current also through the track section S/I, from battery B/III, since a contact $e$, which is inserted in the circuit of the relay R/III and the track section S/I, has now been closed by means of the relay finger $l$. The contact $c$ is broken simultaneously by means of the movable finger $m$ of the relay R/III, in the circuit of the battery V through the signal A, but as the contact $d$ is, at the same time, closed by means of the movable finger $n$ of the same relay, and since moreover, the contact $b$ is closed by means of the finger $o$ of the relay R/I, as the train reaches section S/I, the condition of the circuit of the signal device A is maintained unchanged electrically. Thus no release of the signal device A takes place for trains moving in the direction from S/III to S/I.

When a train has left the track section S/I while moving in the direction S/III to S/I, it is intended, that the current from the battery B/III through the relay R/III shall be diminished to a minimum below the limit, at which the said relay is able to keep its armature attracted. The contact $e$ must therefore be broken, after which the current through the relay will cease. As the track relays used in this combination are arranged in such a way, that resistance of the conductors corresponds to the practically lowest ballast resistance of the track section S/I, difficulty arises in securing release of the armature of the relay R/III, in the event that the sum of the branch currents back to the battery B/III through the relay R/I and the load of the track section S/I approaches the limit at which the relay R/III is able to maintain its armature attracted.

A known manner of overcoming this difficulty consists in providing, in the circuit of the relay R/I, a contact $f$, which is closed by means of the relay finger $p$ only when the relay is without current, said contact being connected in series with the contact $e$ (as indicated in dotted lines) by way of the armature fingers $p$ and $l$ of the relays R/I and R/III in Fig. 1. If now the branch current through the relay R/I together with the current from the battery B/I is able to attract the armature of the relay R/I and consequently to lift the finger $p$, a complete cessation of the current through the relay R/III is obtained, so that the armature of this relay and the fingers $l$, $m$, $n$ must fall. Even this known device is however somewhat unreliable.

The present invention has for its object to provide an arrangement in which relay R/III is able to maintain its armature and the fingers $l$, $m$, $n$ in an attracted position independent of the presence of a contact such as $f$ and independent of the circuit of the battery B/I through track section S/I and relay R/I being unbroken.

According to the invention, the power of attraction exercised by the disengaging relay, (i. e. the relay R/III in the example above described) is so adjusted that the armature of said relay falls, when the resistance in the circuit through the relay is so increased as to exceed the resistance prevailing when a train is moving on the track sections.

This result is obtained by inserting in the circuit of the relay R/III an additional resistance, by using a less number of ampere-turns on the disengaging relay than on the ordinary relay, by increasing the weight of its armature, by increasing the armature gap or by any equivalent means. The same result can also be obtained by shunting or diminishing the current through the disengaging relay during a certain period of time by means of a time switch. An arrangement according to the invention is illustrated in Fig. 2 of the accompanying drawings. Most of the details shown in Fig. 1, are repeated in Fig. 2 and are indicated therein with the same reference letters. According to this arrangement the attractive force exerted by the relay R/III is adjusted by means of a resistance $r$, through which part of the current, intended to be conducted to the relay R/III, is shunted.

For a given voltage of the battery B/III the resistance $r$ may be adjusted in such a way, that the relay R/III is just able to attract its armature when energized by the current received from the battery B/III when a train short circuits the track section S/III. This attracted position of the said armature is maintained in known manner even after the train has reached the track section S/I and has cut off the current through the relay R/I so that its armature and the finger $p$ falls and closes the contact $f$. When, however, the train has at last left the track section S/I, so that the resistance of the circuit of the relay R/III has been augmented, the capacity of attraction of the relay R/III is diminished and it is then no longer able to retain its armature and the contact fingers $l$, $m$, $n$. Provided that the resistance of the relay R/I is not greater than the ballast resistance of the track section S/I, the current through the battery B/III can by adjusting resistance $r$ be made to exert a greater action on the relay R/I than on the relay R/III. This greater action may be adjusted so that the armature of the relay R/III will fall before or simultaneously with the breaking of the contact $f$. Under such circumstances the relay R/I needs no help from the battery B/I in order to break the circuit through the battery B/III. Consequently a break of the circuit at $x_1$, $x_2$, $x_3$ or, if the ballast resistance corresponds to the resistance of the relay R/I at $x_4$, will not prevent the contact finger $l$ of the relay R/III from falling.

In road crossing signal devices, where the special caution signal normally must disappear when the whole train has left the road crossing, the device above described may be used with a relay, adjusted as described and controlled from the relays of the next adjacent track sections.

Fig. 3 illustrates a signal control circuit of this character.

The winding of the disengaging relay is here divided in two parts R/III$^a$, R/III$^b$ neither of which alone, when a train occupies either of the track sections S/I or S/II, is able to effect attraction of the armature of the relay, but which together can attract said armature, if both the track sections S/I, S/II are occupied by trains. Each of these windings is able to sustain the armature after it has once been attracted, and when a train occupies either of the track sections S/I or S/II, the armature falls after the train has left all the track sections and the resistance of the circuit through the relay R/III is thereby increased so as to be greater than the resistance prevailing when the track section or track sections are occupied by trains.

The section S/III of Figs. 1 and 2 is substituted in Fig. 3 by the sections S/I and S/II so far as the direction of the train is concerned. The contact $f$ is closed when the train is coming from B/I into the track section S/I by the falling of the armature of the relay R/I. Current can then flow from the battery B/III through one part R/III$^a$ of the winding of the relay R/III and through the contact $f$ to S/I, whence it proceeds through the wheel axles of the train and then back to the battery B/III. The resulting attraction of the relay R/III is not sufficient to lift the armature of the relay but after the armature of the relay R/II has also fallen, by reason of a train entering the track section S/II, on the other side of the crossing, a contact $f^1$ of the relay R/II, (which is analogous to the contact $f$ of the relay R/I) is closed. Current can now pass also through the second half R/III$^b$ of the relay R/III and the relay armature can be attracted. After the train has left the track section S/I and the relay receives current only through the one part of the winding by way of the wheel axles passing over the track section S/II, the force of attraction exerted by the relay R/III is sufficient to keep the armature attracted. After the train has left the track section S/II also the current in the relay R/III and thus also the force of attraction, is diminished by reason of the fact that the resistance in the circuit through the relay R/III is increased. The relay armature then falls.

The contacts of the external circuit through the signal device are arranged in known manner on the armatures of the three relays.

The contact $f$ of the relay R/I and the analogous contact $f^1$ of the relay R/II may also be connected in series with contacts of the relay R/III and the relay R/III may be connected with the track section S/III in the manner shown in Fig. 2, without affecting the capacity of the relay R/III to release its armature when by reason of a train having passed over all three sections S/I, S/II and S/III, the resistance becomes greater than that prevailing when a train is present on one of the track sections S/I or S/II. The diagram of Fig. 4 illustrates such an arrangement and will readily be understood by reference to the foregoing description of Fig. 2.

Having now particularly described and ascertained the nature of my said invention and in what manner the same is to be performed I declare that what I claim is:—

1. The combination with insulated track sections, of the usual track battery and relay connected with opposite ends of a section, said relay being normally energized and serving, when de-energized, to open an external circuit at one point, means serving to establish another path to keep said external circuit closed on passage of traffic in one direction, said means comprising a second relay and a local battery for energizing the same, and traffic controlled means for connecting the two relays in a series circuit with said local battery, said track relay being more responsive than said second relay to current flowing in such circuit.

2. The combination with insulated track sections, of the usual track battery and relay connected with opposite ends of a section, said relay being normally energized and serving, when de-energized, to break an external circuit, means serving to establish a shunt around such break on passage of traffic in one direction, said means comprising a second relay and a local battery for energizing the same, and means for connecting said second relay and local battery simultaneously with two branch circuits in parallel, one of said branch circuits including the track rails and the other including said track relay.

3. The combination with insulated track sections, of the usual track battery and relay connected with opposite ends of a section, said relay being normally energized and serving, when de-energized to open an external circuit at one point, means serving nevertheless to maintain the integrity of said external circuit on passage of traffic in one direction, said means comprising a second relay and a local battery for energizing the same, and traffic controlled means for connecting the two relays in a series circuit with said local battery, said second relay having adjustable means by which it can be rendered less responsive than said track relay to current flowing in such circuit.

4. The combination with insulated track sections, of the usual track battery and relay connected with opposite ends of a section, said relay being normally energized and serving, when de-energized, to open a normally closed external circuit containing a source of current, means serving to maintain current flowing in said external circuit on passage of traffic in one direction, said means comprising a second relay and a local battery for energizing the same, said second relay having two windings, traffic controlled means for connecting either one or both of said windings in circuit with said local battery, and for including said track relay in series with one of said windings.

In testimony that I claim the foregoing as my invention, I have hereunto signed my name this 15th day of December, A. D. 1927.

JOHN ARTHUR BERGQUIST.

CERTIFICATE OF CORRECTION.

Patent No. 1,846,579.            Granted February 23, 1932, to

JOHN ARTHUR BERGQUIST.

It is hereby certified that error appears in the printed specification of the above numbered patent requiring correction as follows: Page 2, line 116, after the word "after" insert the word that; and that the said Letters Patent should be read with this correction therein that the same may conform to the record of the case in the Patent Office.

Signed and sealed this 22nd day of March, A. D. 1932.

(Seal)

M. J. Moore,
Acting Commissioner of Patents.